(12) United States Patent
Takahashi et al.

(10) Patent No.: US 9,322,718 B2
(45) Date of Patent: Apr. 26, 2016

(54) TEMPERATURE SENSOR

(75) Inventors: Atsushi Takahashi, Saitama (JP); Naohiko Takaku, Saitama (JP); Wataru Isobe, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 506 days.

(21) Appl. No.: 13/817,474

(22) PCT Filed: Jul. 14, 2011

(86) PCT No.: PCT/JP2011/004024
§ 371 (c)(1),
(2), (4) Date: Mar. 28, 2013

(87) PCT Pub. No.: WO2012/023232
PCT Pub. Date: Feb. 23, 2012

(65) Prior Publication Data
US 2013/0208765 A1  Aug. 15, 2013

(30) Foreign Application Priority Data
Aug. 16, 2010  (JP) .................................. 2010-181536

(51) Int. Cl.
*G01K 7/00* (2006.01)
*G01K 1/00* (2006.01)
*G01K 3/00* (2006.01)
(Continued)

(52) U.S. Cl.
CPC .. *G01K 7/22* (2013.01); *G01K 1/08* (2013.01); *G01K 1/16* (2013.01); *G01K 2007/163* (2013.01)

(58) Field of Classification Search
USPC .................................. 374/185, 208, 166, 110
See application file for complete search history.

(56) References Cited

U.S. PATENT DOCUMENTS 6,130,598 A * 10/2000 Katsuki .................... G01K 1/16
338/229
6,264,363 B1 * 7/2001 Takahashi ................ G01K 7/22
338/25

(Continued)

FOREIGN PATENT DOCUMENTS

GB      2184554 A  *  6/1987  ............... G01K 1/08
JP      08-068698 A      3/1996
(Continued)

OTHER PUBLICATIONS

Translation of JP2010-054062 (Mar. 11, 2010).*
(Continued)

*Primary Examiner* — Mirellys Jagan
(74) *Attorney, Agent, or Firm* — Pearne & Gordon LLP

(57) ABSTRACT

An object of the present invention is to provide a temperature sensor which can increase responsiveness while ensuring reliability and can be downsized without changing its mounting configuration from conventional ones. In a temperature sensor 10, two thermistors 20A and 20B are held in a protective tube 11 via holders 30. Flat portions 30*b* are formed on the holders 30, and a filler 60 can be spread throughout the protective tube 11 through spaces 40 between an inner circumferential surface of the protective tube 11 and the flat portions 30*b* as well as spaces 50 between the inner circumferential surface of the protective tube 11 and lateral portions 30*c*. Also, in the protective tube 11, element bodies 21 of the thermistors 20A and 20B are placed side by side close to the inner circumferential surface of the protective tube 11.

10 Claims, 4 Drawing Sheets

(51) Int. Cl.
*G01K 7/22* (2006.01)
*G01K 1/08* (2006.01)
*G01K 1/16* (2006.01)
*G01K 7/16* (2006.01)

(56) References Cited

U.S. PATENT DOCUMENTS

| | | | |
|---|---|---|---|
| 7,441,950 B2 * | 10/2008 | Kamiyama et al. | 374/185 |
| 7,553,078 B2 * | 6/2009 | Hanzawa | G01K 1/08 338/22 R |
| 2002/0001335 A1 * | 1/2002 | Lee | 374/208 |
| 2002/0061049 A1 * | 5/2002 | Adachi et al. | 374/208 |
| 2002/0131477 A1 * | 9/2002 | Kurano | G01K 7/22 374/185 |
| 2002/0135455 A1 * | 9/2002 | Murata et al. | 338/28 |
| 2003/0147452 A1 * | 8/2003 | Adachi et al. | 374/185 |
| 2004/0212477 A1 * | 10/2004 | Shibayama | 338/25 |
| 2009/0059998 A1 * | 3/2009 | Hou | G01K 3/06 374/185 |
| 2010/0158073 A1 * | 6/2010 | Marks | 374/183 |
| 2015/0063423 A1 * | 3/2015 | Hua | G01K 1/08 374/185 |

FOREIGN PATENT DOCUMENTS

| | | |
|---|---|---|
| JP | 3028906 U | 6/1996 |
| JP | 10-221179 A | 8/1998 |
| JP | 2002-289407 A | 10/2002 |
| JP | 2003-240642 A | 8/2003 |
| JP | 2007-212195 A | 8/2007 |
| JP | 2010-054062 A | 3/2010 |

OTHER PUBLICATIONS

Translation of JP2007-212195 (Mar. 23, 2007).*
International Search Report for PCT/JP2011/004024 dated Aug. 23, 2011.

* cited by examiner

TEMPERATURE SENSOR

TECHNICAL FIELD

The present invention relates to a temperature sensor adapted to detect temperatures of hot water from a water heater, various atmospheres, and the like.

BACKGROUND ART

It is well known that a thermistor is used as a temperature detecting element of a temperature sensor used for various purposes.

A temperature sensor adapted to detect temperatures of hot water from a water heater, various atmospheres, and the like adopts a configuration in which a thermistor is housed in a closed-end cylindrical casing and only the casing is exposed in a fluid flow path (see, for example, Patent Literatures 1 to 5). This is intended for insulation between the sensor and fluid, waterproofing, and the like.

Also, some temperature sensors are equipped each with two thermistors (see, for example, Patent Literature 6). Thus, if one of the thermistors fails, temperatures can be detected using the other thermistor. Also, it is possible to troubleshoot the thermistors by comparing detected temperatures between the two thermistors.

CITATION LIST

Patent Literature

Patent Literature 1: Japanese Patent Laid-Open No. 8-68698
Patent Literature 2: Japanese Patent Laid-Open No. 10-221179
Patent Literature 3: Japanese Patent Laid-Open No. 2003-240642
Patent Literature 4: Japanese Patent Laid-Open No. 2002-289407
Patent Literature 5: Japanese Utility Model Registration No. 3028906
Patent Literature 6: Japanese Patent Laid-Open No. 2010-54062

SUMMARY OF INVENTION

Technical Problem

Temperature sensors equipped with two thermistors in this way are always required to increase responsiveness and equalize responsiveness while ensuring reliability.

The present invention has been made in view of such a technical problem and has an object to provide a temperature sensor which can increase responsiveness and equalize responses between two thermistors while ensuring reliability.

Solution to Problem

A temperature sensor according to the present invention comprises: a closed-end cylindrical protective tube with one end side closed and another end side open; two thermistors placed on the one end side in the protective tube; wires connected to respective two poles of the two thermistors; lead wires connected at one end to the respective wires in the protective tube and led out of the protective tube at another end; and a holder made of insulative material and adapted to hold connecting portions between the wires and the lead wires in the protective tube. By holding the connecting portions between the wires and the lead wires in the protective tube using the holder made of insulative material, the temperature sensor configured as described above can reliably insulate the connecting portions and the protective tube from each other. Also, since the protective tube is shaped cylindrically, heat transmitted to the thermistors through the protective tube as well as responsiveness of the two thermistors can be equalized. Besides, when the temperature sensor is mounted on piping or the like, no directionality is exhibited.

Here, the holder is provided with a flat portion on an outer circumferential surface and configured such that a space is formed between an inner circumferential surface of the protective tube and the flat portion when the holder is inserted into the protective tube. Then, the protective tube is filled with a filler made of curable material having insulating properties; and the thermistors, the wires, the lead wires, and the holder in the protective tube are fixed by the filler. Since the space is formed between the inner circumferential surface of the protective tube and the flat portion by the flat portion on the outer circumferential surface of the holder, a flow path for the filler can be secured in the protective tube, allowing the filler to spread throughout the entire inside of the protective tube.

The two thermistors are arranged side by side in the protective tube along a radial direction of the protective tube, with the thermistors being placed close to the inner circumferential surface of the protective tube. This allows heat from outside the protective tube to be readily transmitted to the thermistors via the protective tube and brings thermal responsiveness of the two thermistors to equivalent levels.

Each of the two thermistors may be provided with a holder corresponding thereto. In this case, the connecting portions between the two wires connected to the respective thermistors and the two lead wires connected to the two wires are held by the holders.

Preferably a groove is formed in each of the holders to house the two wires and the two lead wires connected to the two wires; and a plane on a side on which the groove opens is placed facing the other holder in the protective tube. Consequently, the holders are interposed between the wires and the protective tube as well as between the lead wires and the protective tube, increasing withstand voltage characteristics.

Here, the two thermistors may have any characteristics, but if the two have same characteristics, when one of the thermistors failed, the temperature sensor can continue to use the other thermistor.

Advantageous Effects of Invention

According to the present invention, by holding the connecting portions between the wires and the lead wires in the protective tube using the holder made of insulative material, the connecting portions between the wires and the lead wires can be reliably insulated from the protective tube.

Since the space is formed between the inner circumferential surface of the protective tube and the flat portion by the flat portion on the outer circumferential surface of the holder, a flow path for the filler can be secured in the protective tube, allowing the filler to spread throughout the entire inside of the protective tube, and the thermistors, the wires, the lead wires, and the holder are fixed in, and insulated from, the protective tube reliably. This enables downsizing the temperature sensor, and allows the temperature sensor to be used without changing its mounting configuration from conventional ones.

Also, since the two thermistors are arranged side by side in the protective tube by being placed close to the inner circumferential surface of the protective tube, heat from outside the protective tube can be readily transmitted to the thermistors via the protective tube, allowing the temperature sensor to deliver excellent responsiveness.

In this way, a temperature sensor equipped with two thermistors can increase responsiveness while ensuring reliability.

BRIEF DESCRIPTION OF DRAWINGS

[FIG. 1]

FIG. 2 is a diagram showing an external appearance of the temperature sensor.

[FIG. 3]

FIG. 4 is a sectional view showing how two holders are arranged in a protective tube.

DESCRIPTION OF EMBODIMENT

The present invention will be described in detail below with reference to an embodiment shown in the accompanying drawings.

Figure 1A:
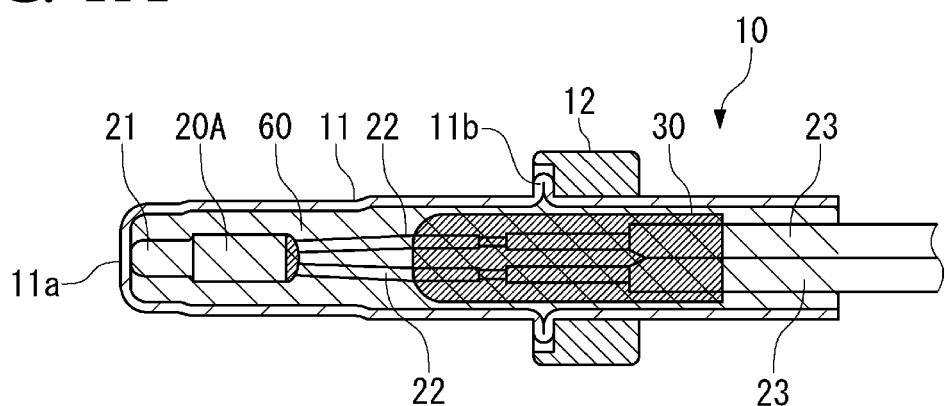
FIG. 1A is a sectional view of a temperature sensor according to the present embodiment and FIG. 1B is a sectional view taken in a direction orthogonal to FIG. 1A.
Figure 1B:
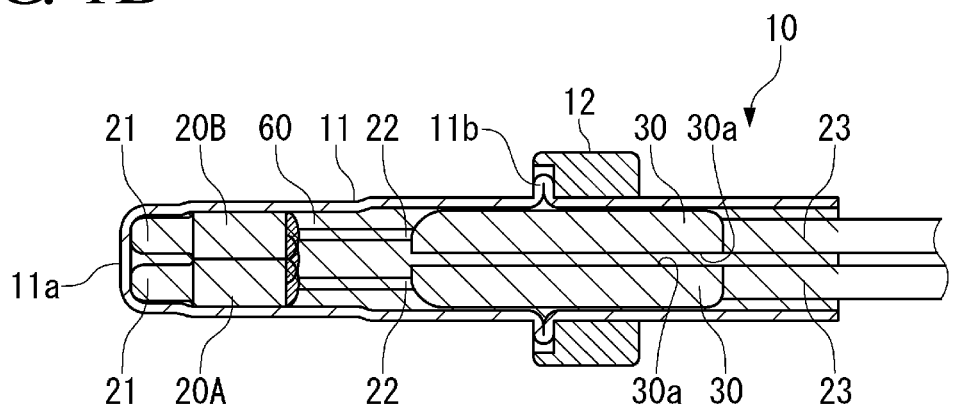

FIGS. 1A and 1B are diagrams for illustrating a configuration of a temperature sensor according to the present embodiment.

As shown in FIGS. 1A and 1B, the temperature sensor 10 has a configuration in which two thermistors 20A and 20B are housed in a protective tube 11.

The protective tube 11 is made of metal such as stainless steel and shaped as a closed-end cylinder which has a circular cross section with a front end portion 11a closed. A bulging portion 11b is formed at a predetermined position on an outer circumferential surface of the protective tube 11, projecting outward, and a retainer ring 12 annular in shape is press-fitted by being pressed against one side of the bulging portion 11b. The bulging portion 11b and retainer ring 12 are used to determine the length of protrusion, hold an O-ring, and fix the temperature sensor 10 using nuts or the like (not shown) to a piping when the temperature sensor 10 is mounted from outside of the piping with the front end portion 11a of the protective tube 11 sticking out into a flow path.

Each of the thermistors 20A and 20B includes an element body 21 made up of a thermistor chip enclosed in glass, and a pair of Dumet wires (wires) 22 connected at one end to both electrodes of the thermistor chip in the element body 21.

The Dumet wires 22 of the thermistors 20A and 20B are connected with respective lead wires 23. According to the present embodiment, the Dumet wires 22 are connected with the lead wires 23 by ultrasonic welding. However, available connection methods are not limited to this.

Figure 2:
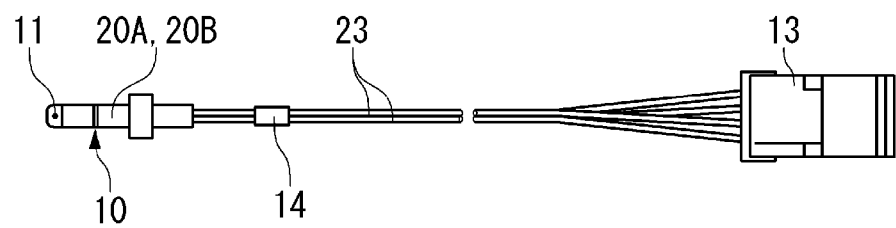
[FIG. 2]

As shown in FIG. 2, the lead wires 23 are led outside through an open end of the protective tube 11 and a terminal housing 13 for use to connect to a controller (not shown) of the temperature sensor 10 is installed at other ends of the lead wires 23. Here, the lead wires 23 of the two thermistors 20A and 20B are bundled by an annular protective tube 14 or a binding band to prevent the lead wires 23 from being torn apart. This makes it possible to avoid imposition of a burden on the element bodies 21 and the like in the protective tube 11 as well as to avoid sensor abnormality and performance degradation caused by water and moisture entering inside.

As shown in FIGS. 1A and 1B, connection areas between the Dumet wires 22 and lead wires 23 of the thermistors 20A and 20B are held by respective holders 30 made of insulative material such as resin. The holders 30 function to hold and fix the Dumet wires 22 and lead wires 23 as well as to insulate the Dumet wires 22 and lead wires 23 from the protective tube 11.

Figure 3A:
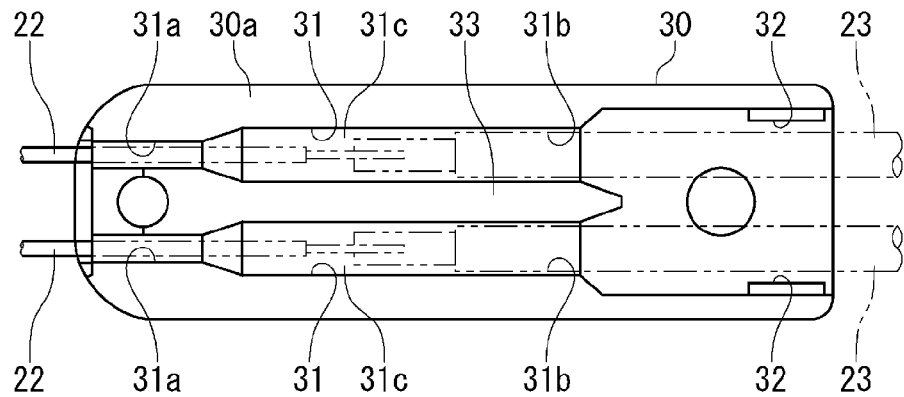
FIG. 3A is a plan view.
Figure 3B:
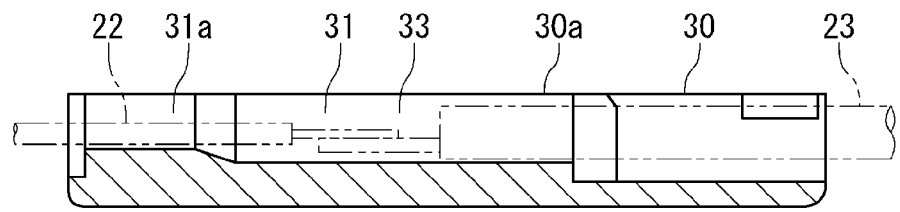
FIG. 3B is a longitudinal sectional view of FIG. 3A.
Figure 3C:
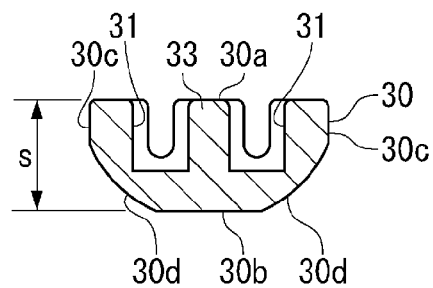
FIG. 3C is a sectional side view of FIG. 3B.

As shown in FIGS. 3A, 3B and 3C, a set of two grooves 31 are formed in the holder 30 and one Dumet wire 22 and lead wire 23 are held in each groove 31. More specifically, grooves 31 contain Dumet wire holding portions 31a adapted to hold coatings of the two respective Dumet wires 22, and lead wire holding portions 31b adapted to hold coatings of the lead wires 23, where the Dumet wire holding portions 31a are installed on one end of the holder 30 and the lead wire holding portions 31b are installed on the other end of the holder 30. The Dumet wire holding portion 31a is approximately equal in width to outside diameter of the Dumet wire 22. On the other hand, the lead wire holding portion 31b is approximately equal in width to outside diameter of the lead wire 23. Preferably claw-shaped restraining hooks 32 are formed in the lead wire holding portions 31b to prevent the two lead wires 23 housed in the lead wire holding portions 31b from falling out. A connecting portion housing portion 31c is formed between the Dumet wire holding portion 31a and lead wire holding portion 31b to house a connecting portion between the Dumet wire 22 and lead wire 23. The connecting portion housing portions 31c are formed in such a way as to be continuous with the respective Dumet wire holding portions 31a, and an insulating wall 33 is formed between the two connecting portion housing portions 31c.

Figure 4:
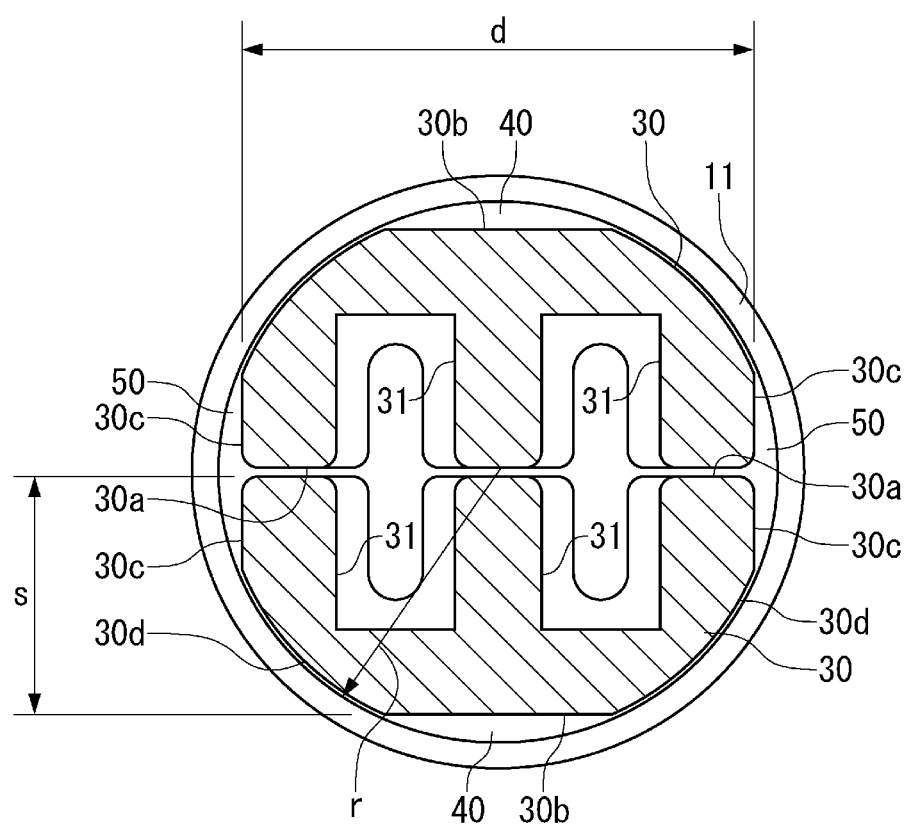
[FIG. 4]

The holder 30 configured as described above has a flat side face (plane) 30a on the side on which the grooves 31 are open. As shown in FIG. 4, two holders 30 adapted to hold the Dumet wires 22 and lead wires 23 of the two thermistors 20A and 20B, respectively, are inserted into the protective tube 11 with the side faces 30a opposing each other.

The holder 30 generally has a substantially semicircular shape except for the side face 30a opposing the other holder 30 of the pair. However, a flat portion 30b substantially parallel to the side face 30a is formed on the opposite side of the holder 30 from the side face 30a. Spacing s between the side face 30a and flat portion 30b is set to be smaller than inside diameter r of the protective tube 11. Consequently, when the two holders 30 facing each other are inserted into the protective tube 11, spaces 40 substantially crescent-shaped in cross section are formed between an inner circumferential surface of the protective tube 11 and the flat portions 30b.

Also, on the holder 30, lateral portions 30c nearly orthogonal to the side face 30a may be formed at locations adjacent to the side face 30a. In this case again, spacing d between the two lateral portions 30c on opposite sides is set to be smaller than diameter 2r of the protective tube 11. Consequently, when the two holders 30 facing each other are inserted into the protective tube 11, spaces 50 substantially crescent-shaped in cross section can be formed between the inner circumferential surface of the protective tube 11 and the lateral portions 30c.

Curved portions 30d substantially equivalent in radius of curvature to the inside diameter r of the protective tube 11 are formed between the flat portion 30b and lateral portions 30c on both sides of the flat portion 30b. When the two holders 30 facing each other are inserted into the protective tube 11, the curved portions 30d function to guide the holders 30 along the inner circumferential surface of the protective tube 11.

The holders 30 configured as described above hold the respective thermistors 20A and 20B, each of which contain the two Dumet wires 22 and lead wires 23 fitted in the grooves 31.

As described above, when the thermistors 20A and 20B are inserted into the protective tube 11 with the side faces 30a of the two holders 30 facing each other, the element bodies 21 are placed side by side in a radial direction of the protective tube 11 and in a direction in which the two holders 30 are put together. At this time, outer circumferential surfaces of the element bodies 21 placed side by side come close to the inner circumferential surface of the protective tube 11. This speeds up heat propagation between the element bodies 21 and protective tube 11 and improves responsiveness.

The protective tube 11 is filled with a filler 60 made of insulative material such as epoxy resin. The filler 60 fixes both Dumet wires 22 and lead wires 23 to the holders 30, fixes the thermistors 20A and 20B and holders 30 to the protective tube 11, and insulates the protective tube 11 from the element bodies 21, Dumet wires 22, and lead wires 23 contained therein. Furthermore, the filler 60 makes the protective tube 11 waterproof.

Preferably the thermistors 20A and 20B are of same type with same characteristics. Consequently, if one of the thermistors 20A and 20B fails, the other can serve as a backup.

The temperature sensor 10 configured as described above is installed with the front end portion 11a of the protective tube 11 sticking out into piping of a water heater. Temperature of hot water flowing through the piping propagates to the thermistors 20A and 20B via the protective tube 11, a resulting electrical signal is transmitted to an external controller via the Dumet wires 22 and lead wires 23, and consequently the hot-water temperature is detected by the controller.

In making the temperature sensor 10 configured as described above, the Dumet wires 22 and lead wires 23 of the element bodies 21 are interconnected and housed in the holders 30 in advance.

Then, a predetermined amount of uncured filler 60 such as epoxy resin is put in the protective tube 11. In this state, the thermistors 20A and 20B and holders 30 are inserted into the protective tube 11. Consequently, the uncured filler 60 rises through the spaces 40 and 50 between the inner circumferential surface of the protective tube 11 and the thermistors 20A and 20B and between the inner circumferential surface of the protective tube 11 and holders 30. Then, as the filler 60 cures, the thermistors 20A and 20B and holders 30 are fixed in the protective tube 11.

Preferably before the thermistors 20A and 20B and holders 30 are inserted into the protective tube 11, the outer circumferential surfaces of the element bodies 21 are coated with cushioning material such as silicon varnish. The cushioning material is intended to prevent the element bodies 21 from being damaged by the filler 60.

In the temperature sensor 10 described above, the two thermistors 20A and 20B are fitted in the protective tube 11 and held in the protective tube 11 by the holders 30. At this time, since the flat portions 30b and lateral portions 30c are formed on the holders 30, the filler 60 can be spread throughout the protective tube 11 through the spaces 40 between the inner circumferential surface of the protective tube 11 and the flat portions 30b as well as the spaces 50 between the inner circumferential surface of the protective tube 11 and the lateral portions 30c. Thus, the filler 60 ensures insulation, fixing, and waterproofing of the element bodies 21, Dumet wires 22, and lead wires 23 in the protective tube 11, making it possible to provide a highly reliable temperature sensor 10.

Since the filler 60 can flow in the protective tube 11 through the spaces 40 between the inner circumferential surface of the protective tube 11 and the flat portions 30b as well as the spaces 50 between the inner circumferential surface of the protective tube 11 and the lateral portions 30c, when the thermistors 20A and 20B are inserted into the protective tube 11, the thermistors 20A and 20B can be inserted smoothly deep into the protective tube 11.

Also, the two holders 30 for the two thermistors 20A and 20B are arranged in the protective tube 11 with the respective side faces 30a opposing each other, where the grooves 31 holding the Dumet wires 22 and lead wires 23 open on the side of the side faces 30a. Consequently, the holders 30 made of insulative material are interposed between the Dumet wires 22 and the protective tube 11 as well as between the lead wires 23 and the protective tube 11, increasing withstand voltage characteristics.

Also, in the protective tube 11, the element bodies 21 of the thermistors 20A and 20B are placed side by side close to the inner circumferential surface of the protective tube 11, allowing heat to be readily conducted to the element bodies 21 via the protective tube 11 and thereby giving excellent sensitivity to the temperature sensor 10.

Although in the embodiment described above, various components of the temperature sensor 10, materials thereof, and the like have been illustrated by way of example, some of the components cited in the above embodiment may be left out or changed as appropriate without departing from the spirit of the present invention.

REFERENCE SIGNS LIST

10 . . . temperature sensor, 11 . . . protective tube, 11a . . . front end portion, 11b . . . bulging portion, 12 . . . ring, 20A, 20B . . . thermistor, 21 . . . element body, 22 . . . Dumet wire (wire), 23 . . . lead wire, 30 . . . holder, 30a . . . side face (plane), 30b . . . flat portion, 30c . . . lateral portion, 30d . . . curved portion, 31 . . . groove, 40 . . . space, 50 . . . space, 60 . . . filler

The invention claimed is:

1. A temperature sensor comprising:
a closed-end cylindrical protective tube with one end side closed and another end side open;
first and second thermistors placed on the one end side in the protective tube;
a first pair of wires connected to two poles of the first thermistor and a second pair of wires connected to two poles of the second thermistor;
a first pair of lead wires connected at one end to the first pair of wires in the protective tube and led out of the protective tube at another end;
a second pair of lead wires connected at one end to the second pair of wires in the protective tube and led out of the protective tube at another end; and
a pair of holders made of insulative material and adapted to hold connecting portions between the first and second pairs of wires and the first and second pairs of lead wires in the protective tube, wherein
each holder has a substantially semicircular cross-section with a flat face and an opposing flat portion on an outer circumferential surface of the holder and is configured such that a space is formed between an inner circumferential surface of the protective tube and the flat portion of the holder when the pair of holders is inserted into the protective tube,
the flat face of each holder opposes the other holder,
each of the first and second thermistors is provided with one of the pair of holders corresponding thereto; and
the connecting portions between the first and second pairs of wires and the first and second pairs of lead wires are held by the pair of holders with wire insulation being provided,
a pair of grooves is formed in each holder that opens on a side of the holder in which the flat face of the holder is provided, wherein each groove is configured to house one wire of the first and second pairs of wires and one lead wire of the first and second pairs of lead wires connected to the one wire.

2. The temperature sensor according to claim 1, wherein the first and second thermistors have same characteristics.

3. The temperature sensor according to claim 1, wherein the first and second thermistors are arranged side by side in the protective tube along a radial direction of the protective tube, with the first and second thermistors being placed close to the inner circumferential surface of the protective tube.

4. The temperature sensor according to claim 3, wherein the first and second thermistors have same characteristics.

5. The temperature sensor according to claim 1, wherein each of the pair of holders includes a curved portion having a radius of curvature substantially equal to an inside radius of the protective tube.

6. The temperature sensor according to claim 5, wherein the curved portion of each holder is formed between the flat portion of the holder and a lateral portion substantially orthogonal to the flat face of the holder.

7. The temperature sensor according to claim 1, wherein the protective tube is filled with a filler made of curable material having insulating properties; and the first and second thermistors, the first and second pairs of wires, the first and second pairs of lead wires, and the pair of holders in the protective tube are fixed by the filler.

8. The temperature sensor according to claim 7, wherein the first and second thermistors have same characteristics.

9. The temperature sensor according to claim 7, wherein the first and second thermistors are arranged side by side in the protective tube along a radial direction of the protective tube, with the first and second thermistors being placed close to the inner circumferential surface of the protective tube.

10. The temperature sensor according to claim 9, wherein the first and second thermistors have same characteristics.

* * * * *